United States Patent
Min et al.

(10) Patent No.: US 9,432,916 B2
(45) Date of Patent: Aug. 30, 2016

(54) SITUATION AWARE SENSOR POWER MANAGEMENT

(71) Applicant: Intel Corporation, Santa Clara, CA (US)

(72) Inventors: Alexander W. Min, Portland, OR (US); Ren Wang, Portland, OR (US); Jr-Shian Tsai, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 94 days.

(21) Appl. No.: 13/728,314

(22) Filed: Dec. 27, 2012

(65) Prior Publication Data
US 2014/0187264 A1 Jul. 3, 2014

(51) Int. Cl.
H04W 24/00 (2009.01)
H04W 48/16 (2009.01)
H04W 48/04 (2009.01)

(52) U.S. Cl.
CPC ............. *H04W 48/16* (2013.01); *H04W 48/04* (2013.01); *Y02B 60/50* (2013.01)

(58) Field of Classification Search
CPC ............... H04W 24/00; H04W 4/005; H04W 72/1205; H04W 84/18
USPC ...... 455/424, 425, 416, 435.1, 456.2, 456.1, 455/426.1, 41.2, 552.1, 26.1, 404.1, 404.2; 370/311
See application file for complete search history.

(56) References Cited

U.S. PATENT DOCUMENTS

| | | | |
|---|---|---|---|
| 6,141,570 A | | 10/2000 | O'Neill, Jr. et al. |
| 6,832,251 B1 * | | 12/2004 | Gelvin et al. ................ 709/224 |
| 7,020,701 B1 * | | 3/2006 | Gelvin et al. ................ 709/224 |
| 8,310,394 B2 * | | 11/2012 | Kim et al. ............... 342/357.31 |
| 8,532,670 B2 * | | 9/2013 | Kim et al. ................ 455/456.1 |
| 8,704,710 B2 * | | 4/2014 | Shen et al. ............... 342/357.29 |

(Continued)

FOREIGN PATENT DOCUMENTS

| | | |
|---|---|---|
| CN | 104813736 A | 7/2015 |
| JP | 2002524002 A | 7/2002 |

(Continued)

OTHER PUBLICATIONS

I.F. Akyildiz, W. Su, Y. Sankarasubramaniam, E. Cayirci. (Wireless sensor networks: a survey Broadband and Wireless Networking Laboratory, School of Electrical and Computer Engineering, Georgia Institute of Technology Atlanta, GA 30332, USA Dec. 12, 2001).*

(Continued)

*Primary Examiner* — Joseph Arevalo
(74) *Attorney, Agent, or Firm* — Jordan IP Law, LLC

(57) ABSTRACT

Methods and systems may provide for determining a status of a mobile platform, wherein the status indicates whether the mobile platform is stationary, and adapting a detection schedule of one or more location sensors on the mobile platform based at least in part on whether the mobile platform is stationary. Additionally, one or more location updates may be generated based at least in part on information from the one or more location sensors. In one example, a location request is received, wherein the detection schedule is adapted further based on quality of service (QoS) information associated with the location request, and wherein the one or more location updates are generated in response to the location request.

28 Claims, 2 Drawing Sheets

(56) References Cited

U.S. PATENT DOCUMENTS

| | | | |
|---|---|---|---|
| 2003/0129995 A1 | 7/2003 | Niwa et al. | |
| 2004/0110530 A1* | 6/2004 | Alone et al. | 455/552.1 |
| 2004/0239525 A1* | 12/2004 | Kobayashi | 340/870.16 |
| 2005/0153697 A1* | 7/2005 | Patel | 455/442 |
| 2006/0209176 A1* | 9/2006 | Nakamura et al. | 348/14.01 |
| 2006/0253598 A1* | 11/2006 | Nakamura et al. | 709/230 |
| 2008/0181179 A1* | 7/2008 | Karaoguz | 370/331 |
| 2009/0098880 A1 | 4/2009 | Lindquist | |
| 2010/0009643 A1 | 1/2010 | Haartsen | |
| 2010/0201516 A1* | 8/2010 | Gelvin et al. | 340/539.26 |
| 2010/0225610 A1* | 9/2010 | Gates et al. | 345/173 |
| 2011/0159884 A1 | 6/2011 | Chawla | |
| 2011/0194471 A1* | 8/2011 | Kim et al. | 370/311 |
| 2011/0246056 A1* | 10/2011 | de Silva et al. | 701/201 |
| 2011/0264940 A1 | 10/2011 | Lin et al. | |
| 2012/0046822 A1* | 2/2012 | Anderson | 701/29.1 |
| 2012/0157113 A1* | 6/2012 | Brisebois et al. | 455/456.1 |
| 2012/0173087 A1* | 7/2012 | Hoffman et al. | 701/48 |
| 2012/0289244 A1 | 11/2012 | Goyal | |
| 2013/0183908 A1* | 7/2013 | Jung et al. | 455/67.11 |
| 2013/0218445 A1* | 8/2013 | Basir | 701/117 |
| 2013/0222158 A1* | 8/2013 | Dai et al. | 340/995.13 |
| 2014/0013136 A1* | 1/2014 | Dadu et al. | 713/323 |
| 2014/0052302 A1* | 2/2014 | Moon | 700/291 |
| 2014/0073325 A1* | 3/2014 | Karaoguz | 455/436 |

FOREIGN PATENT DOCUMENTS

| | | |
|---|---|---|
| JP | 2003-204572 A | 7/2003 |
| JP | 2008117424 A | 5/2008 |
| JP | 2009222486 A | 10/2009 |
| JP | 2011504578 A | 2/2011 |
| JP | 2012080533 A | 4/2012 |
| KR | 10-2011-0043582 A | 4/2011 |
| KR | 10-2012-0029815 A | 3/2012 |
| KR | 2015-0067329 | 6/2015 |
| TW | 201444394 A | 11/2014 |
| TW | I503029 B | 10/2015 |
| WO | 2014105157 | 7/2014 |

OTHER PUBLICATIONS

Office Action received for Taiwan Patent Application No. 102144281, dated on Jan. 16, 2015, 11 pages including 5 pages of English translation.

International Search Report and Written Opinion for International Patent Application No. PCT/US2013/047206, dated Sep. 27, 2013, 9 pages.

International Preliminary Report on Patentability for International Patent Application No. PCT/US2013/047206, dated Jul. 9, 2015, 6 pages.

Office Action for Japanese Patent Application No. 2015-544060, mailed May 24, 2016, 14 pages including 7 pages of English translation.

\* cited by examiner

SITUATION AWARE SENSOR POWER MANAGEMENT

BACKGROUND

1. Technical Field

Embodiments generally relate to power management in mobile platforms. More particularly, embodiments relate to situation aware sensor power management in mobile platforms.

2. Discussion

Modern mobile devices may be equipped with various sensors, such as accelerometers, digital compasses, and ambient light sensors, in order to provide a rich user experience. Many mobile applications and services may heavily rely on information obtained from such built-in mobile sensors. For example, location-based applications may need frequent location estimate updates from location sensors in order to provide accurate results to the user. Frequent or continuous sensing, however, without regard to power implications may incur considerable energy consumption and shorten the battery life, negating the potential benefits of robust sensor information.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
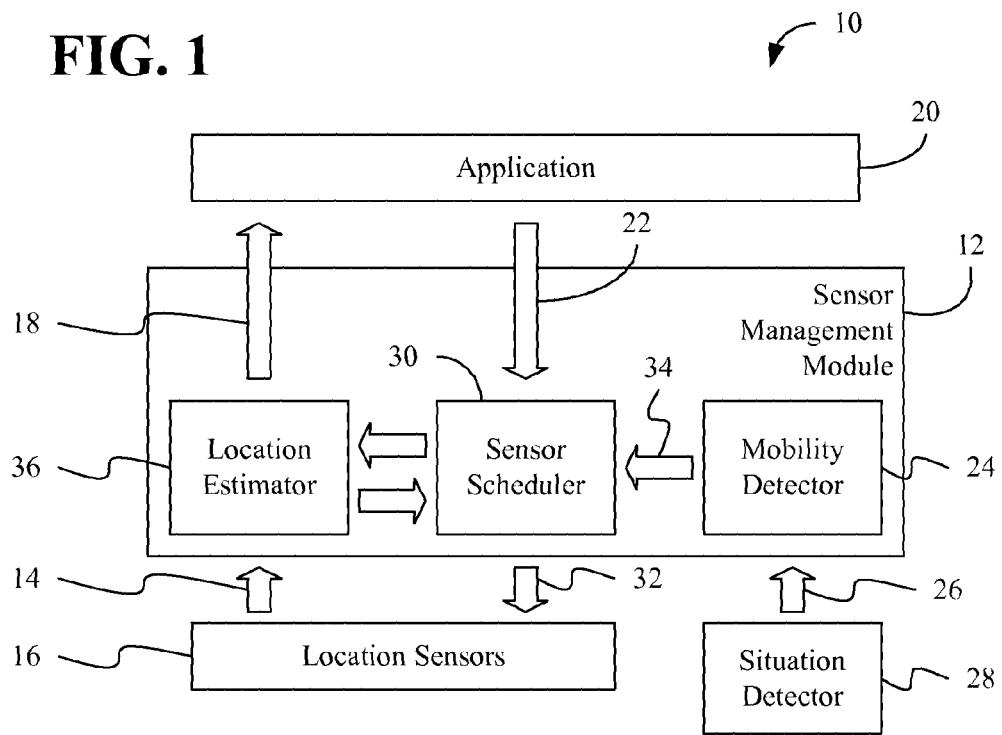
FIG. 1 is a block diagram of an example of a sensor management module according to an embodiment.

FIG. 1 shows an architecture 10 in which sensor information 14 from one or more location sensors 16 is used to provide location updates 18 to an application 20 that issues a request 22 for the location updates 18. The application 20 may be associated with a location based service (LBS) such as, for example, a navigation service, image capture service, electronic commerce (ecommerce) service, game service, etc., wherein the location updates 18 may generally indicate the geographic location and/or physical position of a mobile platform (not shown) containing the location sensors 16. Of particular note is that in order to generate the sensor information 14, the location sensors 16 may draw power from a platform power source such as a battery (not shown). Moreover, interrupts associated with the generation of the sensor information 14 may cause other platform components such as processors, input output (IO) modules, etc., to consume more power.

As will be discussed in greater detail below, a sensor management module 12 (e.g., hardware circuitry, software application, firmware routine, or any combination thereof) may be used to establish and manage a dynamically adaptable detection schedule for the location sensors 16, wherein real-time adjustments to the detection schedule can enable greater power efficiency. The detection schedule may define sensor parameters such as, for example, detection frequency, detection duration, activation status, and so forth. For example, the detection frequency may indicate how often a particular sensor captures and/or generates data, the detection duration may indicate how long a particular sensor captures and/or generates data when it is active, and the activation status may indicate whether a particular sensor is powered on, capturing and/or generating data. Other parameters may also be used in the detection schedule.

In the illustrated example, the sensor management module 12 has a mobility detector 24 that obtains status information 26 from a situation detector 28 and determines a situational status of the platform, wherein the situational status indicates whether the mobile platform is stationary. The mobility detector 24 may therefore include hardware, software, firmware, etc., that is configured to determine when the platform is moving and when the platform is stationary. In this regard, when the mobile platform is stationary, the location sensors 16 may be able to deactivate or otherwise reduce their power consumption because it may be inferred that no meaningful location information will be lost during the deactivation or reduced power time period. In one example, the situation detector 28 is a network interface controller (NIC) and the status information 26 is received signal strength (RSS) information that varies as the mobile platform moves. In such a case, the mobility detector 24 may include an interface to the NIC. The status information 26 could also indicate the number of wireless access points that are in range of the mobile platform, wherein a change in the number of nearby wireless access points can indicate that the mobile platform is not stationary. In yet another example, the situation detector 28 may be an ambient light sensor, wherein the status information 26 includes ambient light information that varies as the mobile platform moves between different environments (e.g., outdoors, indoors, in a pocket) and the mobility detector 24 includes an interface to the ambient light sensor. Other types of situation detectors may also be used to determine whether the mobile platform is stationary.

The sensor management module 12 may also include a sensor scheduler 30 that adapts a detection schedule of one or more of the location sensors 16 based at least in part on whether the mobile platform is stationary. Accordingly, the sensor scheduler 30 may receive mobility information 34 from the mobility detector 24 and issue scheduling decisions 32 to the location sensors 16 based on the mobility information 34. The sensor scheduler 30 may therefore include hardware, software, firmware, etc., that is configured to manage operation of the location sensors 16. In one example, the sensor scheduler 30 has access to various registers and/or memory locations that enable the sensor scheduler 30 to communicate with both the application 20 and the location sensors 16 at an operating system (OS) level of the platform. The scheduling decisions 32 made by the sensor scheduler 30 can implement the detection schedule in a real-time and dynamically adaptable fashion, wherein the detection schedule may provide for modifications of detection frequency, detection duration, activation status, and so forth, of one or more of the location sensors 16.

For example, when the mobile platform is stationary, the sensor scheduler 30 might reduce the detection frequency (e.g., pulse width modulation/PWM frequency), reduce the detection duration (e.g., PWM duty cycle), deactivate one or more of the location sensors 16, etc. If, on the other hand, the mobile platform is not stationary, the sensor scheduler 30 could, for example, increase the detection frequency, increase the detection duration and/or activate one or more of the location sensors 16. The detection schedule may also be adapted based on quality of service (QoS) information associated with the location request 22 from the application 20, as will be discussed in greater detail. The illustrated sensor management module 12 also includes a location estimator 36 that generates the location updates 18 based at least in part on the sensor information 14 from the location sensors 16. The location estimator 36 may therefore include hardware, software, firmware, etc., that is configured to translate the sensor information 14 into a format that is compatible with the application 20 so that the location updates 18 may be accurately received, processed and understood by the application 20. Thus, the location updates 18 might be implemented as interrupts, alerts, messages, etc., wherein the location updates 18 can be application-specific, OS-specific, etc., or any combination thereof.

Figure 2:
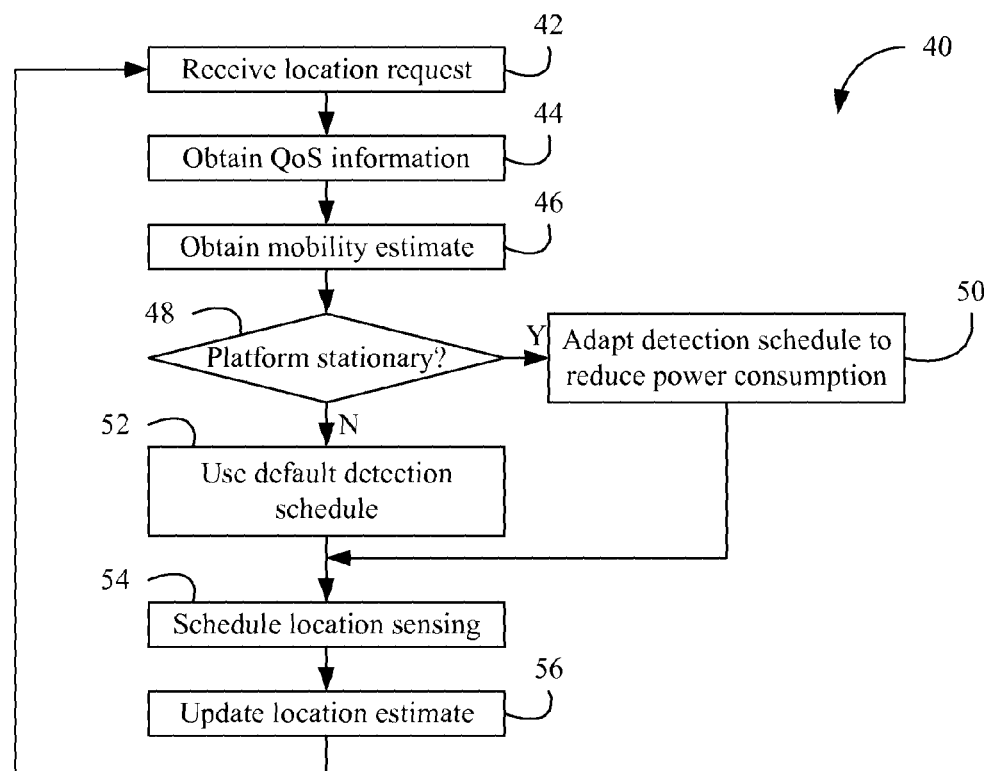
FIG. 2 is a flowchart of an example of a method of managing sensor power according to an embodiment.

Turning now to FIG. 2, a method 40 of managing sensor power is shown. The method 40 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 40 may be written in any combination of one or more programming languages, including an object oriented programming language such as Java, Smalltalk, C++ or the like and conventional procedural programming languages, such as the "C" programming language or similar programming languages.

Illustrated processing block 42 provides for receiving a location request at a mobile platform, wherein QoS information may be obtained from the request at block 44. The QoS information may generally include constraints and/or requirements such as location estimation accuracy, maximum latency, and so forth. A mobility estimate for the mobile platform may be obtained at block 46, wherein the mobility estimate may indicate whether the mobile platform is stationary. Block 46 may therefore involve comparing RSS information to an RSS variation threshold, determining the number of wireless access points in range of the platform, comparing ambient light information to a light variation threshold, and so forth. Thus, it may be determined that the mobile platform is relatively stationary if the variability of the RSS falls below the RSS variation threshold, the number of wireless access points in range of the platform has changed, if the variability of the ambient light falls below the light variation threshold, etc.

If it is determined at block 48 that the platform is stationary, illustrated block 50 adapts the detection schedule of one or more location sensors on the platform to reduce power consumption. The adaptation of the detection schedule may involve modifying, for example, the detection frequency, detection duration and/or activation status of the location sensors on the platform, as already discussed. The adaptation at block 50 may also take into consideration any relevant QoS constraints. For example, if an application requests very accurate location estimation results or explicitly requests a set of sensing parameters to be observed, the adaptation may be minimal or bypassed altogether. If it is determined at block 48 that the platform is not stationary, block 52 may use a default detection schedule. Illustrated block 54 provides for implementing the selected detection schedule, wherein the location estimate may be updated at block 56 based on any available sensor information.

Figure 3:
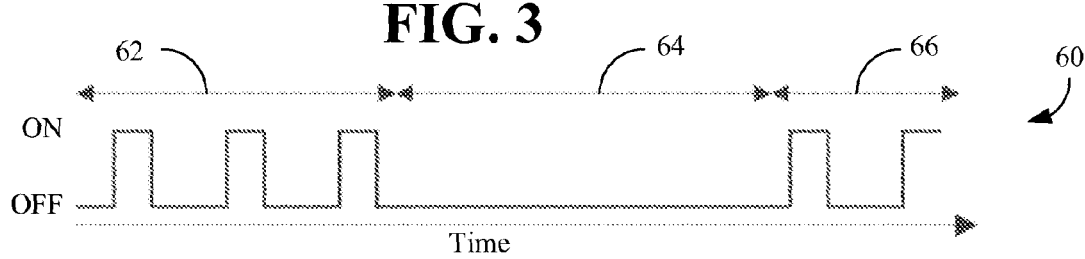
FIG. 3 is a timeline of an example of a sensor power management solution according to an embodiment.

FIG. 3 shows a timeline 60 in which a PWM signal is varied in order to adapt one or more location sensors on a mobile platform to situational conditions. The PWM may generally take on a high state (e.g., logic one) in order to activate the sensors, and may take on a low state (e.g., logic zero) in order to deactivate the sensors. In the illustrated example, during a mobile time period 62, the PWM signal triggers periodic sensing within the location sensors, wherein the sensing result may be used to generate location updates. During a stationary time period 64, on the other hand, the illustrated PWM signal does not trigger any sensing within the location sensors in order to conserve power and extend battery life. Alternatively, the PWM signal might provide power savings by shortening the duty cycle and/or lowering the frequency of the PWM signal during the stationary time period 64. The power savings may be achieved via deactivation of the location sensors as well as via deactivating other platform components (e.g., processors, IO modules) that handle interrupts associated with the generation of the sensor information. When another mobile time period 66 is detected, the PWM signal may resume triggering periodic sensing within the location sensors.

Figure 4:
FIG. 4 is a timeline of an example of a sensor power management solution for a mobile platform having a sensor hub according to an embodiment.

FIG. 4 shows a timeline 70 for a mobile platform having a sensor hub that aggregates sensor information and serves as middleware between the location sensors and applications on the platform. In the illustrated example, during a mobile time period 72, sensor interrupts are output to the platform by the sensor hub along with various other interrupts from other sources (e.g., IO devices, memory devices). During a stationary time period 74, the sensor interrupts may be buffered by the sensor hub, which can create longer idle durations 76. The extended idle durations 76 may provide an opportunity for the platform and/or its components (e.g., processor, IO module, devices) to enter deeper sleep states for longer periods of time in order to further conserve power and extend battery life. When another mobile time period 78 is detected, the sensor hub may resume issuing the sensor interrupts to the platform.

Figure 5:
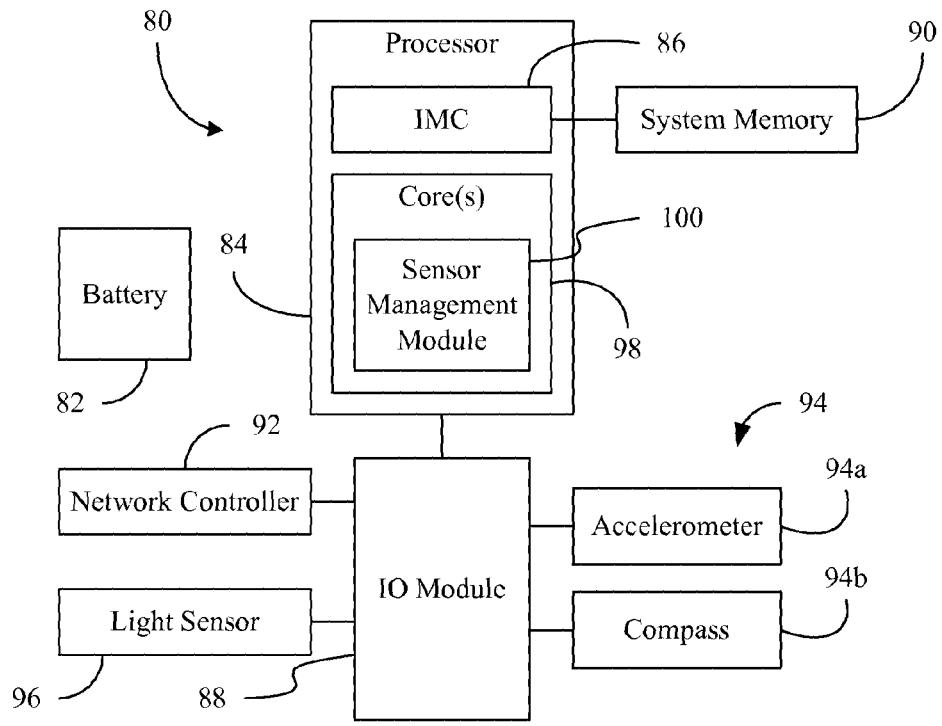
FIG. 5 is a block diagram of an example of a mobile platform according to an embodiment.

Turning now to FIG. 5, a platform 80 is shown. The platform 80 may be part of a mobile device having computing functionality (e.g., personal digital assistant/PDA, notebook computer, smart tablet), communications functionality (e.g., wireless smart phone), imaging functionality, media playing functionality (e.g., smart television/TV), or any combination thereof (e.g., mobile Internet device/MID). In the illustrated example, the platform 80 includes a battery 82, a processor 84, an integrated memory controller (IMC) 86, an IO module 88, system memory 90, a network controller (e.g., NIC) 92, an ambient light sensor 96, and a plurality of location sensors 94 (94a, 94b). The processor 84 may also include a core region with one or several processor cores 98. Although the processor 84 and the IO module 88 are shown as separate blocks, the processor 84 and the IO module 88 may be incorporated onto the same semiconductor die as a system on chip (SoC).

The illustrated IO module 88, sometimes referred to as a Southbridge or South Complex of a chipset, functions as a host controller and communicates with the network controller 92, which could provide off-platform communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The 10 module 88 may also include one or more wireless hardware circuit blocks to support such functionality.

In the illustrated example, the processor cores 98 are configured to execute a sensor management module 100 (e.g., software, hardware logic, etc). The sensor management module 100 may also be located elsewhere in the platform 80 in a component such as, for example, hardware of a chip that is discrete from the processor 84, firmware, and so forth. The sensor management module 100, which may be similar to the sensor management module 12 (FIG. 1), can determine the situational status of the platform 80 by, for example, determining the variability in RSS via information from the network controller 92, wherein the situational status may indicate whether the platform 80 is stationary. The situational status may also be determined by obtaining the number of wireless access points from the network controller 92, or by determining the amount of variability in ambient light from the ambient light sensor 96.

Additionally, the sensor management module 100 may adapt a detection schedule of one or more of the location sensors 94 based at least in part on whether the mobile platform 80 is stationary. For example, the detection schedule of an embedded accelerometer 94a and/or an embedded compass 94b might be adapted in order to minimize the power consumption of those devices. In one example, deactivating the location sensors 94 enables the processor 84 and/or IO module 88 to enter deeper sleep states more frequently and for longer periods of time, wherein the reduced power consumption of the location sensors 94, processor 84 and/or IO module 88 may significantly extend the life of the battery 82. The adaptation of the detection schedules may also take into consideration various QoS constraints such as location estimation accuracy, maximum latency, etc. The sensor management module 100 may also generate one or more location updates based at least in part on information from the location sensors 94. The platform 80 may also include a sensor hub (not shown) that aggregates location updates and outputs the location updates based on the adapted detection schedules.

Thus, techniques described herein may significantly reduce platform power consumption caused by frequent sensor operations, without compromising "always sensing" capability, which can in turn provide a richer user experience. Moreover, the techniques described herein may be suitable in a wide variety of mobility environments.

Embodiments may therefore provide for a method in which a status of a mobile platform is determined, wherein the status indicates whether the mobile platform is stationary. The method may also include adapting a detection schedule of one or more location sensors on the mobile platform based at least in part on whether the mobile platform is stationary, and generating one or more location updates based at least in part on information from the one or more location sensors.

Embodiments may also include a non-transitory computer readable storage medium having a set of instructions which, if executed by a processor, cause a mobile platform to determine a status of the mobile platform, wherein the status is to indicate whether the mobile platform is stationary. The instructions, if executed, may also cause the mobile platform to adapt a detection schedule of one or more location sensors on the mobile platform based at least in part on whether the mobile platform is stationary, and generate one or more location updates based at least in part on information from the one or more location sensors.

Embodiments may also include an apparatus having a mobility detector to determine a status of a mobile platform, wherein the status is to indicate whether the mobile platform is stationary, and a sensor scheduler to adapt a detection schedule of one or more location sensors on the mobile platform based at least in part on whether the mobile platform is stationary. The apparatus can also include a location estimator to generate one or more location updates based at least in part on information from the one or more location sensors.

Embodiments may also include a mobile platform having a battery, one or more location sensors, and a sensor management module. The sensor management module may include a mobility detector to determine a status of the mobile platform, wherein the status is to indicate whether the mobile platform is stationary. Additionally, the sensor management module can include a sensor scheduler to adapt a detection schedule of at least one of the one or more location sensors based at least in part on whether the mobile platform is stationary, and a location estimator to generate one or more location updates based at least in part on information from the one or more location sensors.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chips (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A mobile platform comprising:
   a battery;
   one or more location sensors; and
   a sensor management module including,
      a mobility detector to determine a status of the mobile platform, wherein the status is to indicate whether the mobile platform is stationary,
      a sensor scheduler to adapt a detection schedule of at least one of the one or more location sensors to manage sensor power based at least in part on whether the mobile platform is stationary, and
      a location estimator to generate one or more location updates based at least in part on information from the one or more location sensors,
      wherein the one or more location sensors are to be deactivated when the mobile platform is determined to be stationary.

2. The mobile platform of claim 1, wherein the sensor scheduler is to receive a location request, wherein the detection schedule is to be adapted further based on quality of service (QoS) information associated with the location request, and wherein the one or more location updates are to be generated in response to the location request.

3. The mobile platform of claim 1, further including a network interface controller to generate received signal strength (RSS) information, wherein the status of the mobile platform is to be determined based at least in part on RSS information and an RSS variation threshold.

4. The mobile platform of claim 1, wherein the status of the mobile platform is to be determined based at least in part on a number of wireless access points in range of the mobile platform.

5. The mobile platform of claim 1, further including an ambient light sensor to generate ambient light information, wherein the status of the mobile platform is to be determined based at least in part on the ambient light information and a light variation threshold.

6. The mobile platform of claim 1, wherein the sensor scheduler is to modify one or more of a detection frequency, a detection duration and an activation status of at least one of the one or more location sensors to adapt the detection schedule.

7. The mobile platform of claim 1, wherein the one or more location sensors include one or more of an accelerometer and a compass.

8. An apparatus comprising:
   a mobility detector to determine a status of a mobile platform, wherein the status is to indicate whether the mobile platform is stationary;
   a sensor scheduler to adapt a detection schedule of one or more location sensors on the mobile platform to manage sensor power based at least in part on whether the mobile platform is stationary; and
   a location estimator to generate one or more location updates based at least in part on information from the one or more location sensors,
   wherein the one or more location sensors are to be deactivated when the mobile platform is determined to be stationary.

9. The apparatus of claim 8, wherein the sensor scheduler is to receive a location request, wherein the detection schedule is to be adapted further based on quality of service (QoS) information associated with the location request, and wherein the one or more location updates are to be generated in response to the location request.

10. The apparatus of claim 8, wherein the status of the mobile platform is to be determined based at least in part on received signal strength (RSS) information and an RSS variation threshold.

11. The apparatus of claim 8, wherein the status of the mobile platform is to be determined based at least in part on a number of wireless access points in range of the mobile platform.

12. The apparatus of claim 8, wherein the status of the mobile platform is to be determined based at least in part on ambient light information and a light variation threshold.

13. The apparatus of claim 8, wherein the sensor scheduler is to modify one or more of a detection frequency, a detection duration and an activation status of at least one of the one or more location sensors to adapt the detection schedule.

14. The apparatus of claim 8, wherein the detection schedule of one or more of an accelerometer and a compass is to be adapted.

15. The apparatus of claim 8, further including a sensor hub to aggregate a plurality of location updates and output the plurality of location updates based at least in part on the detection schedule.

16. A method comprising:
    determining a status of a mobile platform, wherein the status indicates whether the mobile platform is stationary;
    adapting a detection schedule of one or more location sensors on the mobile platform to manage sensor power based at least in part on whether the mobile platform is stationary; and
    generating one or more location updates based at least in part on information from the one or more location sensors,
    wherein the one or more location sensors are deactivated when the mobile platform is determined to be stationary.

17. The method of claim 16, further including receiving a location request, wherein the detection schedule is adapted further based on quality of service (QoS) information associated with the location request, and wherein the one or more location updates are generated in response to the location request.

18. The method of claim 16, wherein the status of the mobile platform is determined based at least in part on received signal strength (RSS) information and an RSS variation threshold.

19. The method of claim 16, wherein the status of the mobile platform is determined based at least in part on a number of wireless access points in range of the mobile platform.

20. The method of claim 16, wherein the status of the mobile platform is determined based at least in part on ambient light information and a light variation threshold.

21. A non-transitory computer readable storage medium comprising a set of instructions which, if executed by a processor, cause a mobile platform to:
- determine a status of the mobile platform, wherein the status is to indicate whether the mobile platform is stationary;
- adapt a detection schedule of one or more location sensors on the mobile platform to manage sensor power based at least in part on whether the mobile platform is stationary; and
- generate one or more location updates based at least in part on information from the one or more location sensors,
- wherein the one or more location sensors are to be deactivated when the mobile platform is determined to be stationary.

22. The medium of claim 21, wherein the instructions, if executed, cause the mobile platform to receive a location request, wherein the detection schedule is to be adapted further based on quality of service (QoS) information associated with the location request, and wherein the one or more location updates are to be generated in response to the location request.

23. The medium of claim 21, wherein the status of the mobile platform is to be determined based at least in part on received signal strength (RSS) information and an RSS variation threshold.

24. The medium of claim 21, wherein the status of the mobile platform is to be determined based at least in part on a number of wireless access points in range of the mobile platform.

25. The medium of claim 21, wherein the status of the mobile platform is to be determined based at least in part on ambient light information and a light variation threshold.

26. The medium of claim 21, wherein the instructions, if executed, cause the mobile device to modify one or more of a detection frequency, a detection duration and an activation status of at least one of the one or more location sensors to adapt the detection schedule.

27. The medium of claim 21, wherein the detection schedule of one or more of an accelerometer and a compass is to be adapted.

28. The medium of claim 21, wherein the instructions, if executed, cause the mobile platform to:
- aggregate a plurality of location updates at a sensor hub; and
- output the plurality of location updates based at least in part on the detection schedule.

* * * * *